United States Patent [19]

Fujita et al.

[11] Patent Number: 5,621,708
[45] Date of Patent: Apr. 15, 1997

[54] DISK PLAYER EQUIPPED WITH DISK CHANGER

[75] Inventors: Yoshihiro Fujita, Mitaka; Makoto Takahashi, Oume; Shinji Yamaguchi, Hachiouji; Ryota Okabe, Akikawa, all of Japan

[73] Assignee: Kabushiki Kaisha Kenwood Precision, Akikawa, Japan

[21] Appl. No.: 525,210

[22] Filed: Sep. 8, 1995

[30] Foreign Application Priority Data

Sep. 16, 1994 [JP] Japan .................... 6-246714

[51] Int. Cl.⁶ .................................. G11B 17/22
[52] U.S. Cl. ................. 369/38; 369/36; 369/192; 360/98.06
[58] Field of Search .................... 369/34, 36, 38, 369/191, 192, 194; 360/98.04, 98.06

[56] References Cited

U.S. PATENT DOCUMENTS

| 4,695,990 | 9/1987 | Kawakami | 369/36 |
| 5,123,001 | 6/1992 | Nakamichi et al. | 369/36 |
| 5,177,722 | 1/1993 | Nakamichi et al. | 369/36 |
| 5,289,441 | 2/1994 | Domberg et al. | 369/34 |
| 5,317,554 | 5/1994 | Taylor et al. | 369/77.2 |
| 5,384,760 | 1/1995 | Kumakura | 369/36 |
| 5,392,266 | 2/1995 | Kobayashi et al. | 369/36 |
| 5,459,703 | 10/1995 | Tanaka | 369/36 |
| 5,481,514 | 1/1996 | Yamasaki et al. | 369/36 |
| 5,493,556 | 2/1996 | Aoki et al. | 369/191 |

FOREIGN PATENT DOCUMENTS

| 0563927 | 10/1993 | European Pat. Off. . |
| 0614178 | 9/1994 | European Pat. Off. . |
| 4341362 | 8/1994 | Germany . |
| 3147563 | 6/1991 | Japan . |
| 5282766 | 10/1993 | Japan . |

*Primary Examiner*—Stuart S. Levy
*Assistant Examiner*—Paul J. Ditmyer
*Attorney, Agent, or Firm*—Sixbey Friedman Leedom & Ferguson; Gerald J. Ferguson, Jr.; Evan R. Smith

[57] ABSTRACT

A disk player capable of replacing disks while another disk is being played. A stocker houses a number of disks placed on carriers at its loading steps. A first transport unit transports a carrier between the stocker and the outside of the disk player. A second transport unit transports a carrier between the stocker and a playing unit. The stocker is raised or lowered by a stocker moving unit. It is possible to transport a disk on the carrier to the outside of the disk player and replace it with a new disk, while another disk on the carrier is being played.

3 Claims, 4 Drawing Sheets

DISK PLAYER EQUIPPED WITH DISK CHANGER

BACKGROUND OF THE INVENTION

1. Field of the Invention

The present invention relates to a disk player equipped with a disk changer, and more particularly to a disk player capable of exchanging disks while another disk is being played.

2. Related Background Art

Among conventional disk players equipped with a disk changer, there is a disk player of the type that a disk to be played is selected from a magazine loaded in the player and accommodating a number of disks.

In replacing a disk in the magazine of such a disk player by a new disk, the magazine is once pulled out of the player and the disk in the magazine is replaced by the new one. However, disks are not allowed to be exchanged while one disk is being played, in order to prevent a new disk from being inserted inadvertently into the empty space of the disk now being played.

To solve this problem, the assignee of this application filed Japanese Patent Laid-open application No.3-147563 which proposes a disk player capable of exchanging disks while another disk is being played. According to this disk player, each disk placed on its carrier is inserted in a stocker fixedly mounted on the disk player, and a slider tray is provided for each carrier. In exchanging disks, the carrier together with the slider tray is pulled out of the disk player. In playing a disk, the carrier which places the disk thereon is pulled out of the stocker and moved downward onto a playing unit.

This player is associated, however, with some problems that the number of slider trays used for pulling out the carriers becomes large and that a transport mechanism for transporting a disk to the playing unit becomes complicated with a number of components. Furthermore, since each slider tray is required to extend out of the housing of the disk player, a large area of the front panel of the disk player is occupied because the extension of all slider trays. This results in restrictions in designing a large display area on the front panel.

SUMMARY OF THE INVENTION

The invention has been made under the above circumstances. It is an object of the present invention to provide a disk player capable of exchanging disks while another disk is being played, and reducing the number of components.

It is another object of the invention to provide a disk player which does not occupy a large area of the front panel of the disk player when disks are exchanged.

According to one aspect of the present invention, there is provided a disk player comprising: a stocker capable of housing a plurality of disks; a playing unit for playing a disk; first transport means for transporting a disk between the stocker and the outside of the disk player; second transport means for transporting a disk between the stocker and the playing unit, at a different position from the first transport means relative to the stocker; and stocker moving means for moving the stocker so as to make the height of a disk flush with the transport height of the first or second transport means, wherein a disk is adapted to be transported to the outside of the disk player and replaced by a new disk while another disk is being played.

According to another aspect of the present invention, there is provided a disk player comprising: a stocker capable of housing a plurality of disks; a playing unit for playing a disk; first transport means for transporting a disk between the stocker and the outside of the disk player; second transport means for transporting a disk between the stocker and the playing unit, at a different position from the first transport means relative to the stocker; and stocker moving means for moving the stocker so as to make the height of a disk flush with the transport height of the first or second transport means, wherein a disk is adapted to be loaded in, or dismounted from, the stocker in different directions.

According to a further aspect of the present invention, there is provided a disk player comprising: a stocker capable of housing a plurality of disks; a playing unit for playing a disk; first transport means for transporting a disk between the stocker and the outside of the disk player; second transport means for transporting a disk between the stocker and the playing unit, at a different position from the first transport means relative to the stocker; and stocker moving means for moving the stocker so as to make the height of a disk flush with the transport height of the first or second transport means, wherein the direction of dismounting a disk from the stocker by the first transport means is opposite to the direction of loading a disk in the stocker by the second transport means.

The height of pulling a carrier out of the stocker by the first transport means is made different from the height of pulling a carrier out of the stocker by the second transport means.

According to the disk player of this invention, in addition to a transport means for transporting a carrier of the disk housed at each loading step of the stocker to the outside of the disk player, another transport means for transporting a disk to a playing means is provided. These transport means pull carriers out of the stocker in opposite directions. Therefore, while one disk on the carrier is being played, another disk on the carrier can be replaced by a new disk.

The height of each loading step of the stocker is made flush with a transport height of the first or second transport means. Accordingly, the first and second transport means are required only to move the carrier horizontally, simplifying the mechanical structure.

Furthermore, if the height of the first transport means pulling the carrier out of the stocker is made different from the height of the second transport means pulling the carrier out of the stocker, the first and second transport means can engage with the carriers and pull them out of the stocker. Therefore, a motion span of the first and second transport means for selecting carriers of disks to be played or replaced can be made small.

DETAILED DESCRIPTION OF THE PREFERRED EMBODIMENTS

Figure 1:
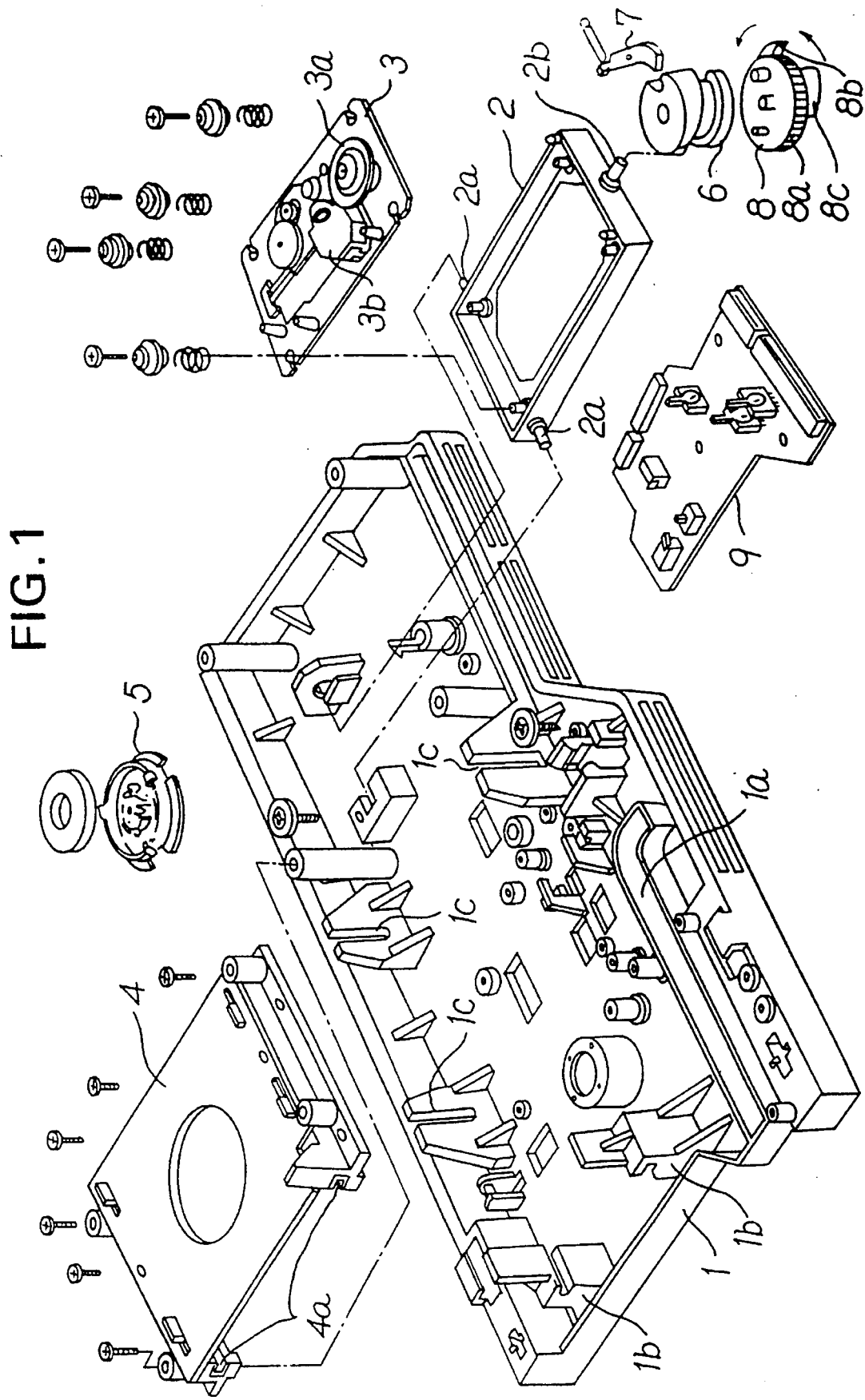
FIG. 1 is a broken perspective view showing part of a disk player according to an embodiment of the invention.
Figure 2:
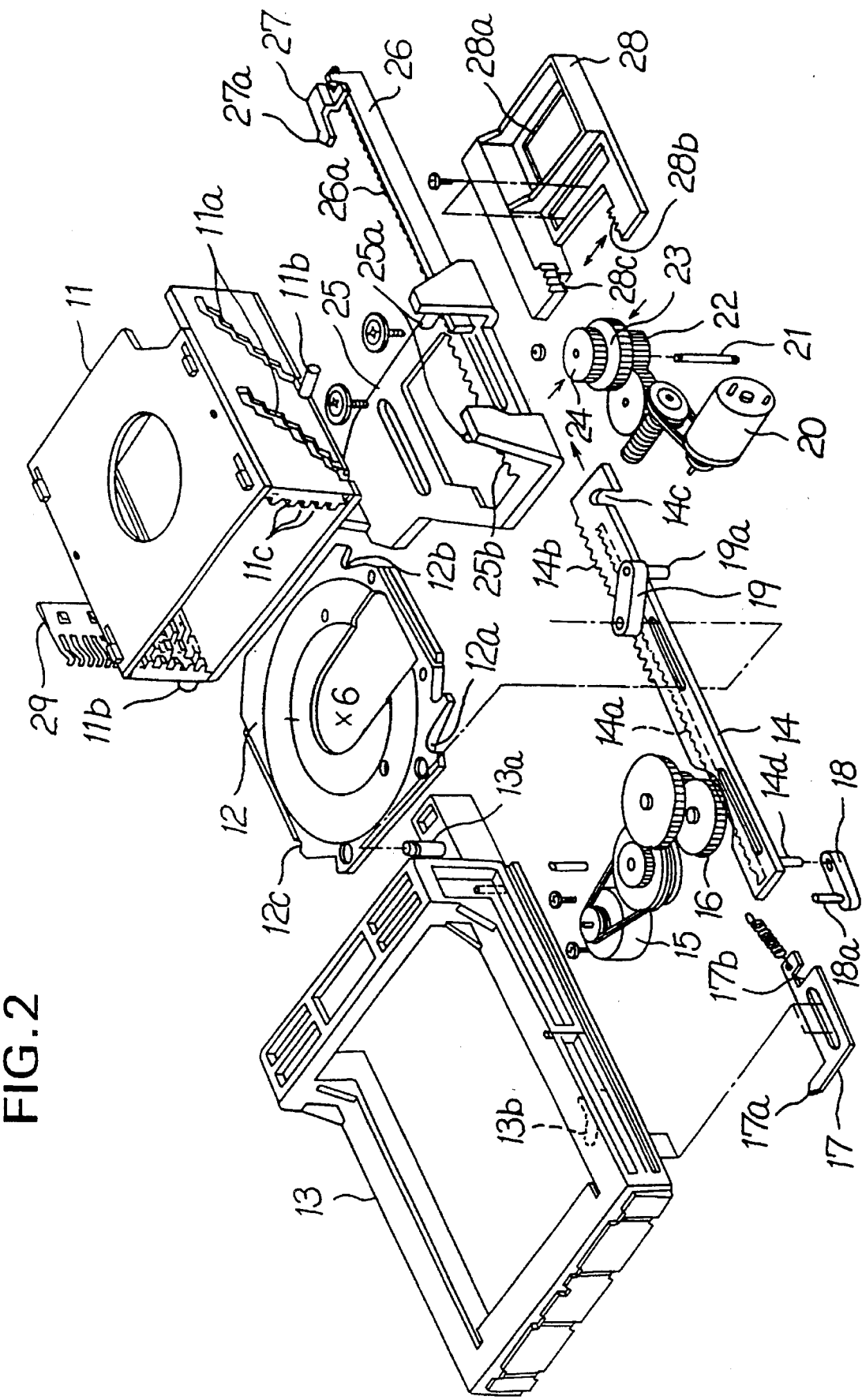
FIG. 2 is a broken perspective view showing different part of the disk player shown in FIG. 1.

A disk player according to an embodiment of the invention will be described with reference to the accompanying drawings. FIGS. 1 and 2 are broken perspective views showing the disk player according to the embodiment of the invention.

In FIG. 1, reference numeral 1 represents a main chassis on which the disk player is mounted. A frame 2 rotatably supports a playing unit chassis 3 on which a playing unit mechanism is mounted. Specifically, the playing unit chassis 3 is fastened to the frame 2 by screws with damper springs, and shafts 2a and 2a formed on the frame 2 are rotatably supported by the main chassis 1.

Another shaft 2b is formed on the frame 2 at its front end on the side opposite to the shafts 2a and 2a. The shaft 2b engages with a cam groove of a cylindrical cam 6. As the cylindrical cam 6 rotates, the frame 2 rotates about the shafts 2a and 2a.

A disk motor is fixedly mounted on the playing unit chassis 3, and a turntable 3a is fixed to the rotary shaft of the disk motor. An optical pickup 3b is mounted on the playing unit chassis 3 so as to be fed in the radial direction of a disk placed on the turntable 3a.

A support member 4 is fastened on the main chassis 1 by screws, being disposed over the playing unit chassis 3. The support member 4 holds a clamper 5 over the turntable 3a. Guide grooves 4a and 4a formed in the inner wall of the support member 4 guide a carrier 12 shown in FIG. 2. The carrier 12 shown in FIG. 2 can place a disk thereon. Six carriers are supported by grooves 11c formed in the inner walls of the stocker 11 and housed therein. In this embodiment, although six carriers 12 are used, the invention is not limited to this number, but the number of carriers is optional.

A recess 12b of the carrier 12 placing a disk thereon engages with a projection 27 of an engaging member 27. The carrier is transported by the engaging member 27 from the stocker 11 to the turntable 3a. As the playing unit chassis 3 rotates, the turntable 3a rises. The disk on the carrier 12 is clamped between the turntable 3a and the clamper 5, and rotated by the disk motor.

While the disk is rotated, the optical pickup 3b is fed in the disk radial direction to reproduce signals recorded on the disk. Components mounted on the playing unit chassis 3, the clamper 5, and the driving mechanism on the playing unit chassis 3 constitute a disk playing unit.

Three shafts 11b, 11b, and 11b are formed on the stocker 11 (two shafts 11b and 11b being on the rear side of the stocker). These shafts 11b, 11b, and 11b are fitted in vertical slits 1c, 1c, and 1c formed in the main chassis 1. Three shafts 25a, 25a, and 25a formed on the slider 25 are fitted in three slanted and stepped grooves 11a, 11a, and 11a formed in the side walls of the stocker 11 (one groove being formed in the rear side wall of the stocker 11).

The slider 25 is supported on the main chassis 1 being slidable thereon. As the slider 25 slides on the main chassis 1, the stocker 11 is moved upward and downward. A slider tray 13 is supported by the main chassis 1 being slidable thereon. The slider tray moves between two positions, one being where it covers the stocker 11 and the other being where it extends out of the main chassis and the housing of the disk player. An engaging plate 17 is supported by the slider tray 13, being slidable thereon, and is energized backward by a spring. A rack plate 14 is supported by the slide tray 13, being slidable thereon, and its rack 14a meshes with a gear 16 which is rotatably supported on the main chassis 1 and rotated by a motor 15 via a belt and a gear train.

A lever 18 is rotatably supported by a shaft 14d formed on the rack plate 14. A shaft 18a formed on the lever 18 engages with a groove 13b formed in the slider tray 13. As the rack plate 14 moves relative to the slider tray 13, the lever 18 is guided by the groove 13b and rotates so that the shaft 18a enters or retracts from a groove 17b formed in the engaging plate 17. A projection 17a of the engaging plate 17 engages with a recess 12a formed in the carrier 12.

Another lever 19 is rotatably supported by a shaft 13a formed on the slider tray 13. A shaft 19a formed on the lever 19 engages with a J-character shaped guide groove 1a formed in the base chassis 1. The shaft 19a can also enter a recess 14c formed in the rack plate 14. The lever 19 is rotated as the rack plate 14 moves.

Rotary force of a motor 20 fixedly mounted on the main chassis 1 is transmitted to a driver gear 22 which is rotatably supported by a shaft 21 formed on the main chassis 1. An internal gear 23 and a carrier gear 24 are also rotatably supported by this shaft 21. These gears constitute a planetary gear mechanism.

Specifically, a sun gear integrally formed with the driver gear 22, although not seen in FIG. 2 because the internal gear 23 shields it, faces the internal teeth of the internal gear. The sun gear and the internal teeth meshes with a planetary gear common to the sun gear and the internal gear. The planetary gear is supported by a shaft formed on the carrier gear 24, and can revolve about the sun gear and can rotate abut itself. The outer teeth of the internal gear 23 mesh with a rack 25b of a slider 25. The carrier gear 24 meshes with a rack 26a of a rack plate 26 which rotatably supported by the main chassis 1 and engages with the engaging member 27. When the internal gear 23 stops while the driver gear 22 is being rotated, the carrier gear 24 starts rotating, and when the carrier gear 24 stops, the internal gear 23 starts rotating.

A braking member 28 is supported by the main chassis 1, being slidable thereon. As the braking member 28 moves upper left as viewed in FIG. 2, teeth 28b formed on the braking member 28 mesh with the outer teeth of the internal gear 23. As the braking member 28 moves lower right as viewed in FIG. 2, teeth 28c of the braking member 28 mesh with the carrier gear 24.

A cam 8c of a gear 8 shown in FIG. 1 enters a hole 29a formed in the braking member 28. The braking member 28 is driven as the gear 8 rotates. The gear engages with the cylindrical cam 6 via a pin to rotate the cylindrical cam 6. The gear 8 is rotated by the rack plate 14.

Specifically, as the rack plate 14 moves upper right as viewed in FIG. 1, the rack plate 14 pushes the projection 8b of the gear 8 to rotate the gear 8. Therefore, the teeth 8a of the gear 8 mesh with the rack 14b of the rack plate 14 so that the rack 14b then rotates the gear 8. When the engagement of the rack plate 14 with the gear 8 is released, the lever 7 energized by a spring engages with a recess of the cylindrical cam 6 so that the cylindrical cam 6 and the gear 8 stop their rotation.

A circuit board 9 has micro switches for detecting motion positions of each constituent element and electrically control the disk player. The circuit bard 9 is attached to the main chassis 1 by screws. Position alignment plate springs 29 engage with recesses 12c of the carriers 12 in the stocker 11 to lightly align in position each carrier 12 in the stocker 11.

Figure 4A:
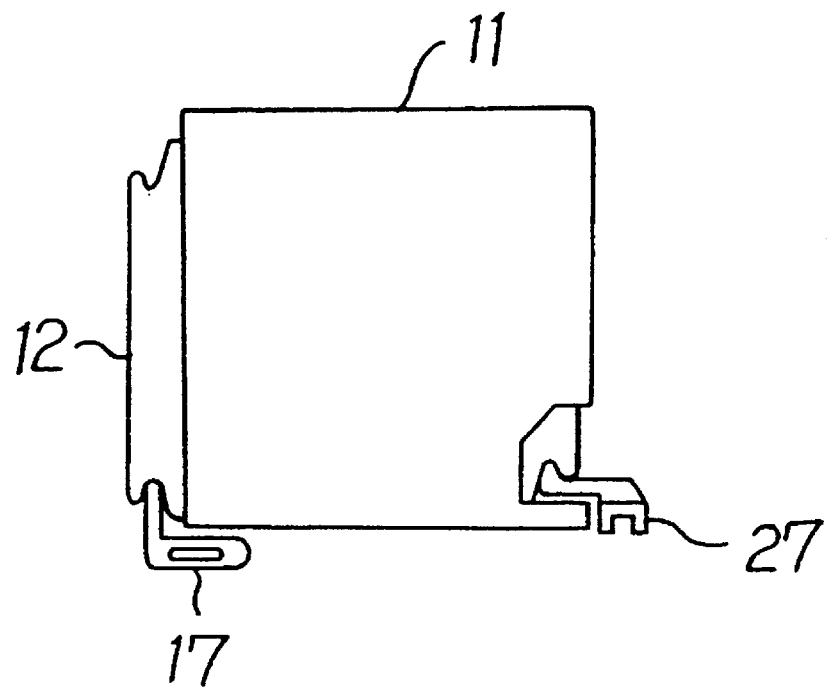
FIG. 4A is a plan view showing part of the disk player shown in FIG. 1.

Next, the operation of the disk player constructed as above will be described. Under the initial conditions, the engaging member 27 and the engaging plate 17 engage with the carrier 12 in the stocker 11, as shown in FIG. 4A. The rack plate 14 is at the position just before it detaches from the gear 8 which is rotating in the clockwise direction as viewed from the top thereof.

The turntable 3a is at the raised position. The braking member 28 has been moved by the cam 8c lower right as viewed in FIG. 2, and the teeth 28c are meshing with the carrier gear 24 to stop it. Only the internal gear 23 is rotated by the motor 20 so that the slider 25 is moved.

Under the initial conditions, a disk to be played can be selected by raising or lowering the stocker 11 and making the height of the carrier of the disk flush with the engaging member 27, or a disk to be replaced can be selected by making the height of the carrier flush with the engaging plate 17.

First, disk replacement will be described. Disk replacement can be performed under the initial conditions or under the playing state wherein the engaging member 27 has moved the carrier 12 to the turntable 3a.

After the height of the carrier 12 of a disk to be replaced is made flush with the engaging plate 17, the rack plate 14 is moved by the motor 15 lower left as viewed in FIG. 2. During the initial period while the rack plate 14 is being moved, the lever 19 rotates in the clockwise direction, and the shaft 19a engages with the guide groove 1a at the portion perpendicular to the motion direction of the slider tray 13 so that the slider tray 13 does not move.

The lever 18 is guided and rotated by the groove 13b, and the shaft 18a enters the groove 17b of the engaging plate 17 which is then driven lower left as viewed in FIG. 2. The carrier 12 is fed by the engaging plate 17 and its front end enters the groove (not visible in FIG. 2) of the slider tray 13. Therefore, the carrier 12 is held by the slider tray 13.

Figure 4B:
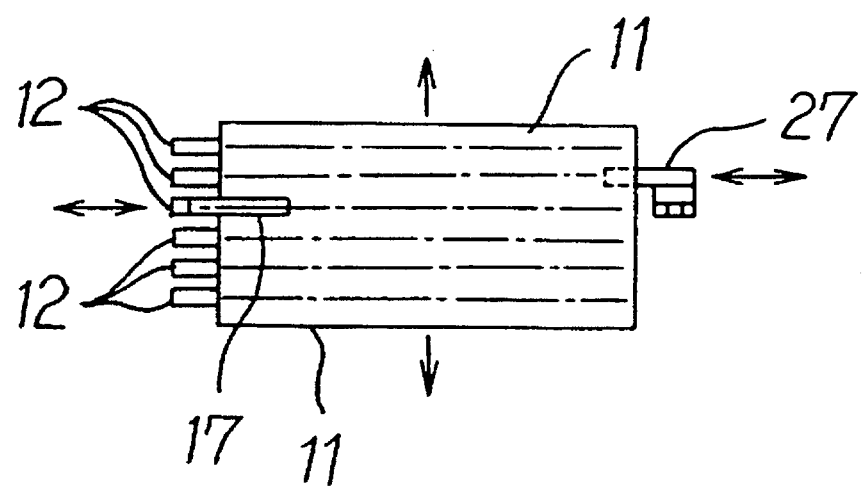
FIG. 4B is a side view of FIG. 4A.

As shown in FIG. 4B, since the engaging plate 17 and the engaging member 27 are different in height and engage with different carriers, the engaging plate 17 can pull the carrier out of the stocker 11, with the engaging member 27 being engaged with another carrier in the stocker 11.

As the rack plate 14 further moves, the recess 14c engages with the shaft 19a so that the lever 19 rotates in the counter clockwise direction. Then, the shaft 19a engages with the guide groove 1a at the portion extending to the motion direction of the slider tray 13. Therefore, the slider tray 13 becomes movable and the shaft 19a is pushed by the recess 14c so that the slider tray 13 moves lower left as viewed in FIG. 2 and extends out of the housing of the disk player.

Figure 3A:
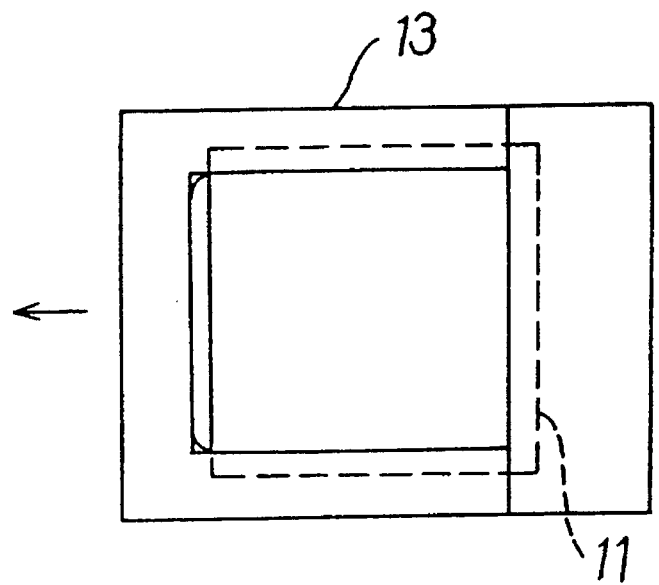
FIG. 3A is a plan view showing part of the disk player shown in FIG. 1.
Figure 3B:
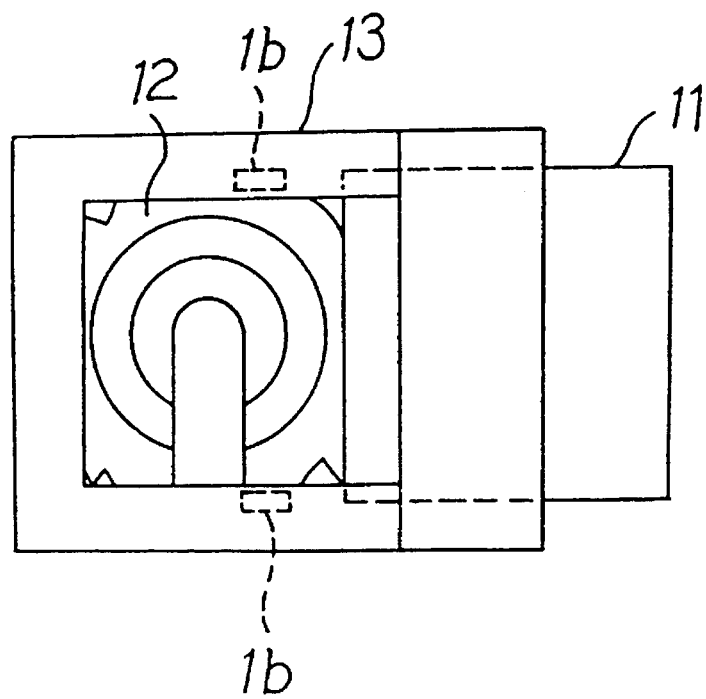
FIG. 3B is a plan view showing the state changed from that shown in FIG. 3A.

Specifically, the slider tray 13 moves from the position shown in FIG. 3A to the position shown in FIG. 3B. In the state shown in FIG. 3B, the slider tray 13 extends out of the housing of the disk player, and the carrier 12 is also pulled out of the housing by the engaging plate 17, in unison with the slider tray 13.

In this state, the side edges of the carrier 12 are fitted in, and supported by, the grooves of guide members 1b and 1b of the main chassis 1. In the state shown in FIG. 3B, the disk on the carrier 12 is replaced by a new disk, or a new disk may be placed on the carrier 12 if it is empty.

The carrier 12 can be loaded in the stocker 11 by rotating the motor 15 in the reverse direction.

In this case, the shaft 19a is guided by the J-character shaped guide groove 1a and the lever 19 rotates in the clockwise direction. All disks on the carriers may be replaced by repeating the operations of raising and lowering the stocker, selecting a carrier, extending the selected carrier out of the housing of the disk player, and replacing the disk by a new one.

Next, an operation of playing a disk on the carrier under the initial conditions will be described. After the carrier of a disk to be played is made flush with the engaging member 27 by raising or lowering the stocker, the rack plate 14 is moved by the motor 15 upper right as viewed in FIG. 2 so that the teeth 8a of the gear 8 mesh with the rack 14b, and the gear 8 and the cylindrical cam 6 are rotated in the counter clockwise direction.

The turntable 3a is therefore lowered, the braking member 28 moves upper left as viewed in FIG. 2, and the internal gear 23 is stopped. The carrier gear 24 is rotated by the motor 20 and the rack plate 26 is moved upper right as viewed in FIG. 2. The carrier 12 is moved to the turntable 3a by means of the engaging member 27 and the rack plate 26.

The rack plate 14 is moved by the motor 15 to the position just before it detaches from the gear 8. The cylindrical cam 6 rotates in the clockwise direction, and the turntable 3a is raised to clamp the disk for playing it. In this state, the motor 20 can move the slider 25 to allow the disk to be replaced as described earlier. The disk player can therefore perform disk replacement while another disk is being played.

Returning the disk back to the stocker 11 after the completion of playing it can be performed by rotating the motors 15 and 20 in the direction opposite to the direction when the disk is placed on the turntable. The position of the carrier of the disk in the playing state is stored in a storage device not shown so that the disk can be returned to the original carrier after the completion of playing it.

According to the disk player of this invention, in addition to a transport means for transporting a carrier of the disk housed at each loading step of the stocker to the outside of the disk player, another transport means for transporting a disk to a playing means is provided. These transport means pull carriers out of the stocker in opposite directions. Therefore, while one disk on the carrier is being played, another disk on the carrier can be replaced by a new disk.

The height of each loading step of the stocker is made flush with a transport height of the first or second transport means. Accordingly, the first and second transport means are required only to move the carrier horizontally, simplifying the mechanical structure.

Furthermore, if the height of the first transport means pulling the carrier out of the stocker is made different from the height of the second transport means pulling the carrier out of the stocker, the first and second transport means can engage with the carriers and pull them out of the stocker. Therefore, a motion span of the first and second transport means for selecting carriers of disks to be played or replaced can be made small.

What is claimed is:

1. A disk player comprising:

a stocker capable of housing a plurality of disks;

a playing unit for playing a disk;

first transport means for retrieving a disk from the stocker at a first height and transporting a disk between said stocker and the outside of the disk player;

second transport means for retrieving a disk from said stocker at a second height different from the first height and transporting a disk between said stocker and said playing unit, at a different position from said first transport means relative to said stocker; and stocker moving means for moving said stocker so as to make the height of a disk flush with the transport height of said first or second transport means, wherein a disk is adapted to be transported to the outside of the disk player and replaced by a new disk while another disk is being played.

2. A disk player comprising:

a stocker capable of housing a plurality of disks;

a playing unit for playing a disk;

first transport means for retrieving a disk from the stocker at a first height and transporting a disk between said stocker and the outside of the disk player;

second transport means for retrieving a disk from said stocker at a second height different from the first height and transporting a disk between said stocker and said playing unit, at a different position from said first transport means relative to said stocker; and stocker moving means for moving said stocker so as to make the height of a disk flush with the transport height of said first or second transport means, wherein a disk is adapted to be loaded in, or dismounted from, said stocker in different directions.

3. A disk player comprising:

a stocker capable of housing a plurality of disks;

a playing unit for playing a disk;

first transport means for retrieving a disk from the stocker at a first height and transporting a disk between said stocker and the outside of the disk player;

second transport means for retrieving a disk from said stocker at a second height different from the first height and transporting a disk between said stocker and said playing unit, at a different position from said first transport means relative to said stocker; and stocker moving means for moving said stocker so as to make the height of a disk flush with the transport height of said first and second transport means, wherein the direction of dismounting a disk from said stocker by said first transport means is opposite to the direction of loading a disk in said stocker by said second transport means.

* * * * *

UNITED STATES PATENT AND TRADEMARK OFFICE
CERTIFICATE OF CORRECTION

PATENT NO. : 5,621,708
DATED : April 15, 1997
INVENTOR(S) : Yoshihiro FUJITA et al.

It is certified that error appears in the above-indentified patent and that said Letters Patent is hereby corrected as shown below:

On title page, item
[73] Assignee: Kabushiki Kaisha Kenwood,
Tokyo, Japan
and
Kabushiki Kaisha Kenwood Precision,
Tokyo, Japan Signed and Sealed this Twelfth Day of August, 1997

Attest:

BRUCE LEHMAN

Attesting Officer

Commissioner of Patents and Trademarks